June 26, 1962 W. J. BROWN 3,040,496
ELECTRIC CONTROL CIRCUIT

Filed Oct. 23, 1957 7 Sheets-Sheet 1

Fig.1.

INVENTOR.
Walter J. Brown
BY
Benj. T. Rauber
ATTORNEY

Fig. 1A.

June 26, 1962 W. J. BROWN 3,040,496
ELECTRIC CONTROL CIRCUIT
Filed Oct. 23, 1957 7 Sheets-Sheet 4

INVENTOR.
Walter J. Brown
BY
Benj. J. Rauber
ATTORNEY

Fig. 14.

INVENTOR.
Walter J. Brown
BY
Benj. T. Rauber
ATTORNEY

June 26, 1962 W. J. BROWN 3,040,496
ELECTRIC CONTROL CIRCUIT
Filed Oct. 23, 1957 7 Sheets-Sheet 7

INVENTOR.
Walter J. Brown
BY
Benj. T. Rauber
ATTORNEY

United States Patent Office 3,040,496
Patented June 26, 1962

3,040,496
ELECTRIC CONTROL CIRCUIT
Walter J. Brown, Stamford, Conn., assignor to Aerotec Industries, Inc., a corporation of Connecticut
Filed Oct. 23, 1957, Ser. No. 691,952
28 Claims. (Cl. 55—105)

My invention relates to an electric control circuit for controlling the electric potential or voltage supplied to electric precipitators or to other electric apparatus in which sparking occurs.

An electric precipitator is an apparatus for separating suspended particles or dust carried in a stream of air or other gas such as the fly ash carried in the products of combustion from steam generators fired by powdered coal. The particles are separated by passing the gaseous medium in which they are suspended between a pair of electrodes at a high electric potential difference so that the particles are projected by electric force out of the gaseous stream. A high D.C. potential difference is preferred and is conveniently supplied from an A.C. power line through a high voltage step-up transformer and a rectifier using kenotron tubes or high voltage solid state rectifiers. The speed and effectiveness of the separation are greater the higher the voltage or potential difference between the electrodes but this voltage is limited by the tendency for a spark to pass from one electrode to the other when the potential difference between the electrodes exceeds a value depending upon the conditions prevailing in the separator. The spark in itself is not destructive but it may develop into an arc which would cause deterioration and eventual destruction of an electrode and would also decrease the potential difference between the electrodes and decrease the effectiveness of separation of the particles. Accordingly it is desirable to reduce the power supplied to the electrodes immediately when a spark occurs in order to prevent arcing and then to restore it to a value at which dust separation is effective.

In my invention the voltage or potential difference between the electrodes is not restored immediately to the full value at which sparking occurs as that would cause too rapid a repetition of sparking, but it is brought to a value somewhat short of the potential difference at which sparking would be liable to occur and is then increased at a controlled rate. In this way the potential difference between the electrodes is kept at the maximum value permitted by the conditions within the separator without excessive sparking.

In my invention this is attained by providing a direct current reference voltage in a control circuit, which gradually increases from a value corresponding to a voltage in the precipitator below which sparking occurs, to a value at which sparking occurs, and by balancing against this reference voltage a feedback voltage which is dependent upon the value of precipitator current. The precipitator current is regulated by a control device in accordance with the difference between this reference voltage and the feedback voltage, so that the precipitator current rises at a controlled rate. I also provide means whereby each time that a spark occurs the direct current reference voltage is stepped down slightly after which it continues to rise at a controlled rate until the next spark occurs. This has the effect of reducing the current in the separator in accordance with the decrease in the direct current reference voltage after the occurrence of each spark after which it again gradually increases.

Furthermore, I provide means whereby immediately after each spark the precipitator current is momentarily shut down substantially to zero to prevent formation of an arc, after which the current quickly recovers to an average value which is slightly less than the value before the spark. This reduced value of the current is established by the reduced value of the direct current reference voltage. This is accomplished by applying a quenching signal which is derived from a spark sensing circuit applied to the control device to drop the separator current momentarily to zero or to a substantially reduce value.

An over-riding current-limiting control is also provided which prevents the average precipitator current from rising above a predetermined value even if no sparking should occur. This is provided to prevent the precipitator current from exceeding a value which the kenotron or other rectifiers will safely withstand.

The various features of my invention are illustrated, by way of example, in the accompanying drawings in which.

Figure 1:
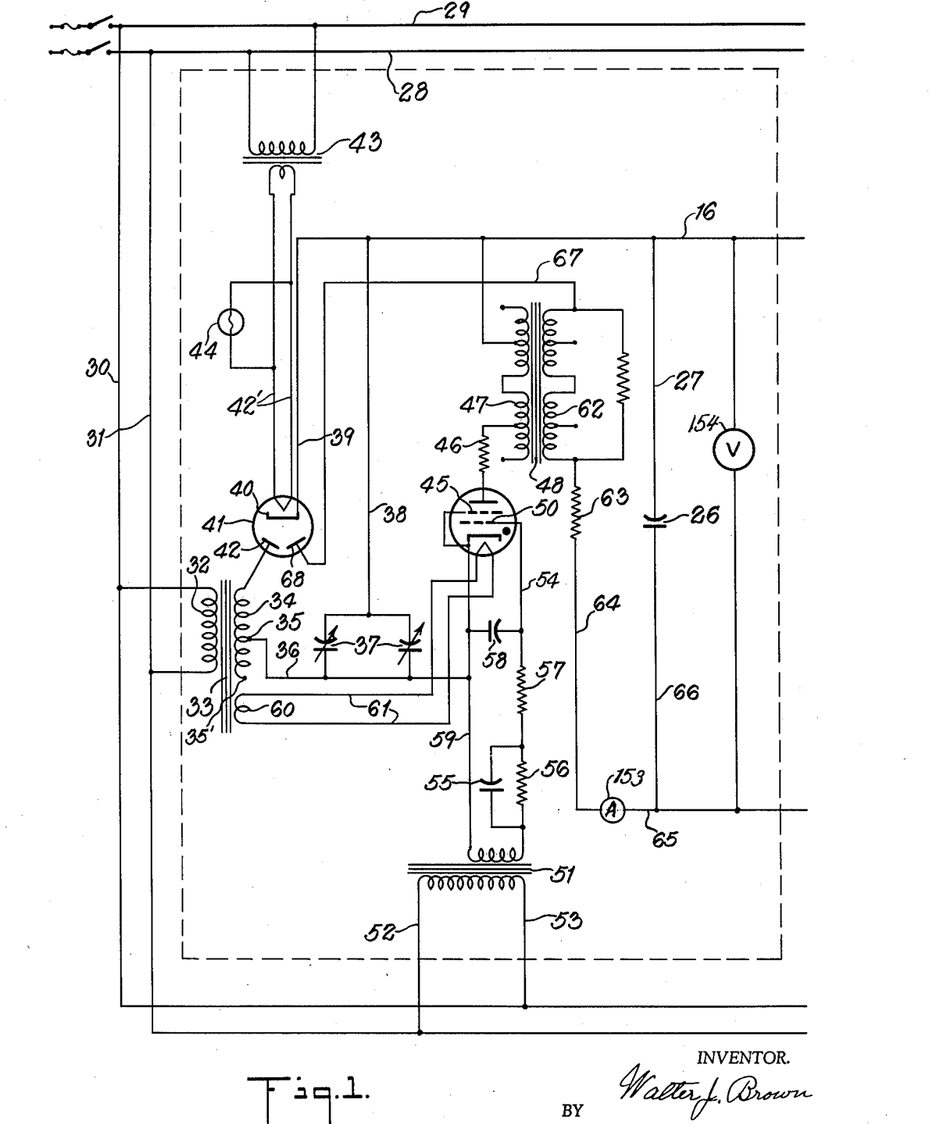
FIGS. 1, 1A and 1B show a wiring diagram of one form of the control circuits, and
FIGS. 2 to 11 inclusive are charts of the voltages and currents at various points in the circuits during the operation of the apparatus.
Figure 1A:
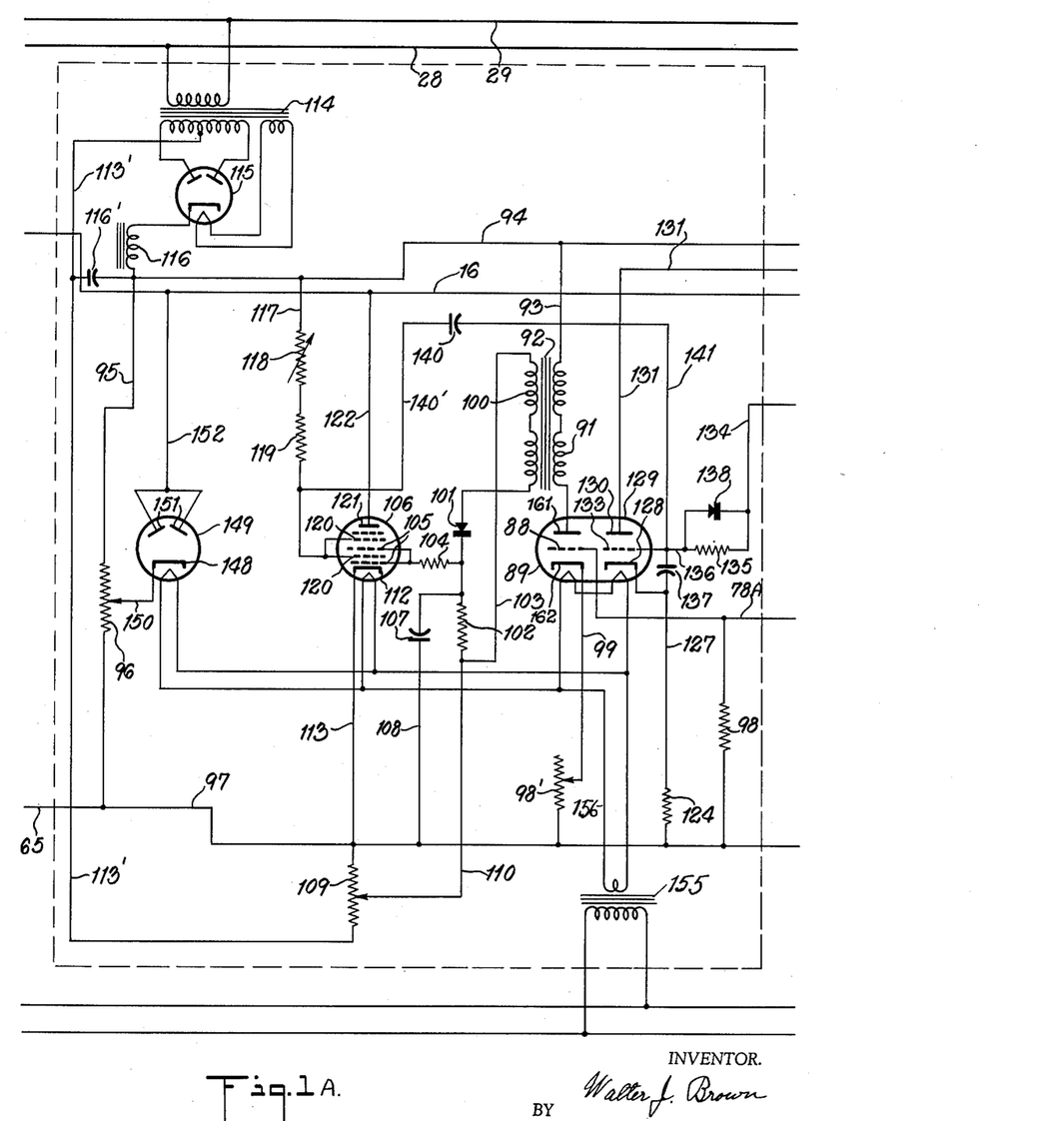
Figure 1B:
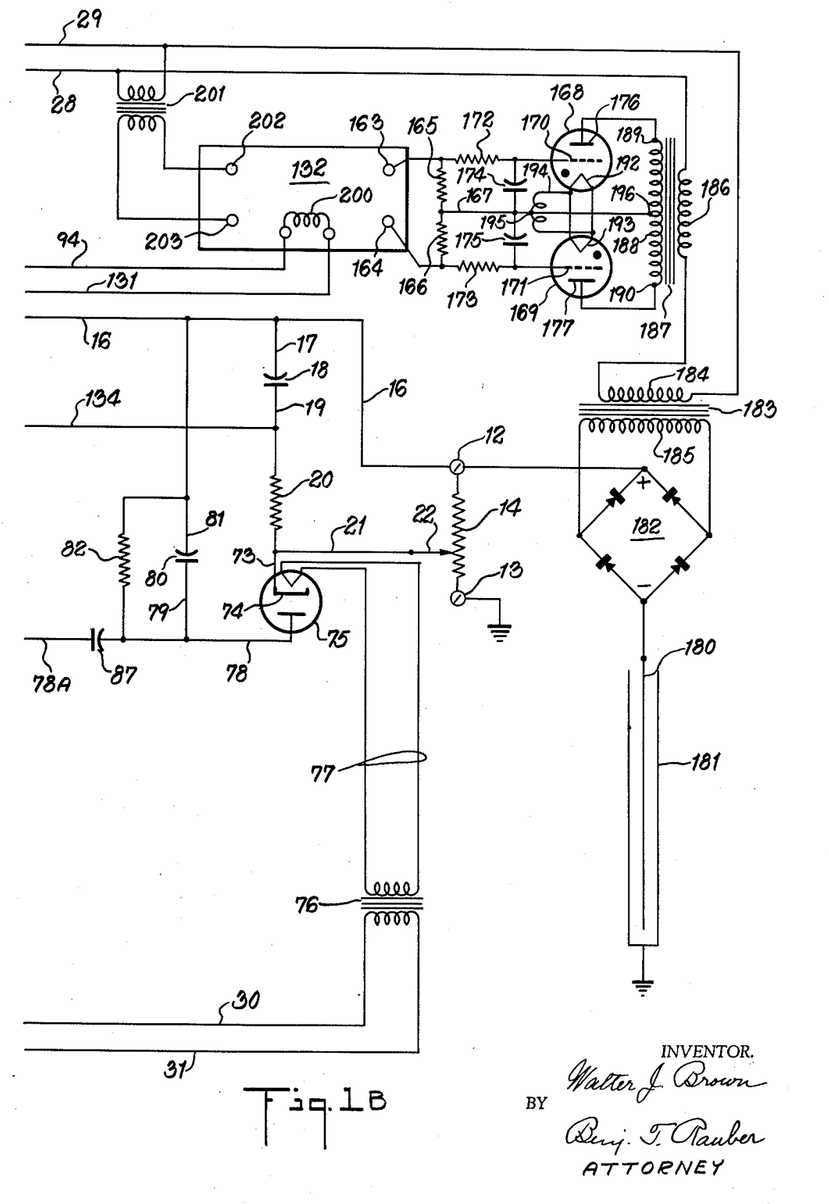

FIGS. 1, 1A and 1B illustrate the wiring diagram of a control system for controlling the power supplied to an electrostatic precipitator by a rectifier supplied by a high voltage transformer. The precipitator is shown diagrammatically in FIG. 1B as a high voltage wire 180 and a grounded metallic tube 181; the rectifier is shown at 182 and the high voltage transformer is shown at 183, with a primary winding 184 and a secondary winding 185. The primary winding 184 is connected in series with the primary winding 186 of another transformer 187, to A..C. power supply mains 28 and 29. Transformer 187 is known as a "series transformer" and it has a secondary winding 188, the ends 189 and 190 of which are respectively connected to the anodes 176 and 177 of thyratrons 168 and 169; the cathodes 192 and 193 of the thyratrons are connected together to the filament transformer 194, the center tap 195 of which is connected to a center tap 196 on the secondary 188 of the series transformer. The purpose of the series transformer 187 is to vary the power supplied from the A.C. mains 28, 29 to the high voltage transformer 183 in accordance with the conduction periods or firing angles of the thyratrons 168 and 169. During the thyratron conduction periods, the secondary 188 of transformer 187 is virtually short circuited, so that full current can flow through its primary 186 to the primary 184 of the high voltage transformer 183; during the non-conducting periods of the thyratrons, the secondary 188 of the series transformer is open circuited, so that very little current can flow through its primary 186 to the primary 184 of the high voltage transformer. In this way, the power supplied to the precipitator through high voltage transformer 183 and rectifier 182 can be varied from substantially zero to maximum by varying the firing angle of the thyratrons 168 and 169, in other words by varying the phase angle of an A.C. voltage applied to their grids 170 and 171 in relation to the A.C. voltage applied to their anodes 176 and 177. The means whereby I control the phase angle and power output automatically will now be described in detail.

Figure 2:
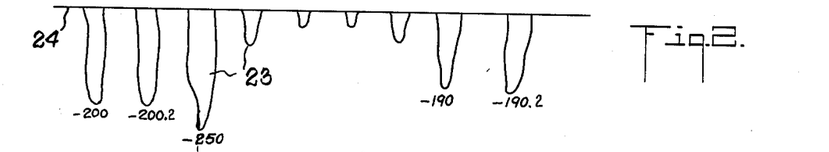
Figure 3:
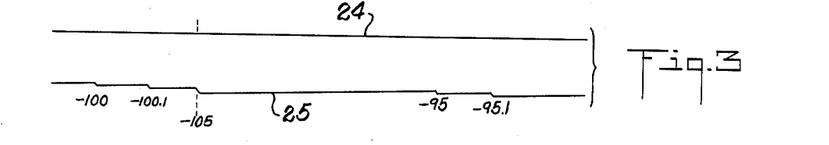
Figure 4:
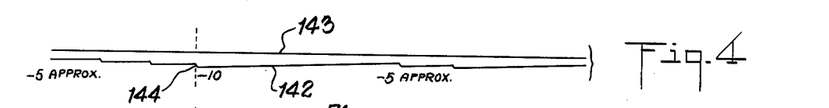

Referring to FIG. 1B, the precipitator current enters the control system at terminal 12 and returns to ground at the terminal 13, the terminal 12 being at a positive potential relative to ground. If desired, an external shunt may be connected across terminals 12 and 13 to by-pass a fraction of the precipitator current. From the terminal 12 the current passes through a potentiometer 14 to ground and also passes into a bus connector 16. The tap 22 on potentiometer 14 is connected through conductor 21, resistor 20 and conductor 19 to the negative plate of condenser 18. The positive plate of condenser 18 is connected through conductor 17 to the bus connector 16. An instantaneous voltage or potential difference, such as shown in FIG. 2, is developed at the tapping 22, in relation to terminal 12 and bus connector 16, as indicated by the curves 23, these being the successive instantaneous voltages below the zero potential line 24 which represents the potential of the bus connector 16. These successive instantaneous voltages charge the negative plate of condenser 18 to a potential, shown in the curve 25 of FIG. 3, proportional to the average precipitator current. This feedback voltage of condenser 18 is compared to a reference voltage across a reference condenser 26, FIG. 1, the positive plate of which is connected to the bus line 16 through a branch lead 27. The condenser 26 is charged to a smaller voltage than the condenser 18 and its voltage is gradually increased by charging it from an independent power source.

Alternating electric current for building up the voltage of the condenser 26 is supplied from A.C. power mains 28 and 29 through branch leads 30 and 31 FIG. 1 to the primary 32 of a transformer 33 having a secondary 34. From a point 35 on the secondary 34 a lead 36 leads to the negative plates of an adjustable condenser combination 37, the positive plates of which are connected by a lead 38 to the bus lead 16 and thence through a lead 39 to a cathode 40 of a rectifier 41. The anode 42 of the rectifier is connected to a terminal of the secondary 34. The cathode 40 is heated by a circuit 42' from the power mains 28 and 29 having a step-down transformer 43. A pilot light 44 may be provided for the circuit 42'. At each alternate half cycle the condenser 37 is thereby charged to a relatively high voltage, for example, 500 volts. Thus a small charge is imposed on the condenser 37 for each cycle namely, sixty cycles per second. The charge for each cycle may be adjusted by adjusting the capacity of the condenser 37 or by altering the tapping point on transformer secondary 34 from point 35 to point 35' for instance.

During the alternate half cycles the condenser 37 is discharged through a transformer which charges the reference condenser 26. The condenser 37 is discharged through a small thyratron 45, a resistance 46 and the primary 47 of a transformer 48 to the bus wire 16 and return lead 38 to the condenser 37. The grid 50 of the thyratron 45 is controlled by a transformer 51 the primary of which is supplied from the power source 28, 29 through the leads 30 and 31 and branches 52 and 53. One terminal of the transformer secondary is connected to the grid 50 through a circuit comprsing a lead 54, a condenser 55 and a biassing resistance 56 arranged in parallel and a resistance 57 in series therewith. The lead 54 is also connected to a condenser 58. A lead 59 connects the opposite terminal of the secondary to the cathode of the thyratron 45 to the opposite plate of the condenser 58 and to the condenser 37 to initiate the current to discharge the condenser 37 only during alternate half cycles which are intermediate between the charging half cycles. The cathode of the thyratron may be heated by current taken from a small secondary 60 of the transformer 32 through leads 61.

An alternating current is generated by the discharge of the condenser 37 in a secondary 62 of the transformer 48, one terminal of which is connected through a resistance 63, lead 64, bus bar 65 and lead 66 to the negative plate of the condenser 26, while the other terminal is connected through a lead 67 to an anode 68 in the rectifier 41. Rectified current thus passes through the rectifier to the cathode 40 and thence through the lead 39, bus bar 16 and lead 27 to the positive plate of the reference condenser 26.

In the above circuit for charging the reference condenser 26, a charge is imparted during one half cycle to the charging condenser 37 in a circuit independent of the reference condenser 26 and, in the other half cycle the condenser 37 is discharged through the transformer primary 47 to induce a charging potential in the secondary 62 which is rectified and is used to charge the reference condenser 26. At each spark in the precipitator the charge on the condenser 26 is suddenly reduced to a lower value by discharging it momentarily through an electronic tube 106, FIG. 1A, in accordance with pulses transmitted through condenser 87, FIG. 1B, in a manner which will later be described, and the charge is then gradually restored in a succession of very small steps by charges from the condenser 37. The rate of charging of the condenser 26 is relatively slow and may be adjusted by altering the value of condenser 37. The voltage across condenser 26 accordingly increases by minute steps, as shown on exaggerated scale in FIG. 5, in which the curve 69 represents the negative voltage relative to the zero line 70, the potential of which is that of bus bar 16. The decrease in negative voltage at the spark is shown at 71 and the successive recharging steps at 72.

Each time that a spark occurs in the precipitator or separator the current through the precipitator is suddenly increased as the spark acts as a short-circuit, and accordingly the current through the resistor 14, FIG. 1B, is suddenly increased thus resulting in a sudden increase of voltage between terminals 12 and 13. The potential at tapping 22 accordingly becomes suddenly more negative with respect to terminal 12 and bus bar 16, as shown by the change of potential from −200 to −250 volts in FIG. 2. This change in potential is used to step down or decrease the voltage across the condenser 26 as follows:

The instantaneous change of potential at tapping 22, with reference to bus bar 16, is transmitted through the lead 21 and a branch lead 73 to the cathode 74 of a peak rectifier 75, the cathode being heated by current supplied from the branch leads 30 and 31 through transformer 76 and leads 77. The rectified current is then lead through a lead 78 and branch lead 79 to the negative plate of a condenser 80 the opposite or positive plate of which is connected through a branch lead 81 to the bus bar 16. The instantaneous, peak, voltage thus serves to charge the condenser 80. The condenser is shunted by the resistor 82 which is selected to provide a suitable time constant.

Figures 7, 8:
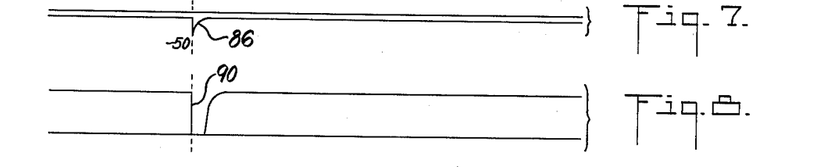

Normally the voltage of the condenser 80 remains substantially constant as there is no sparking. When a spark occurs it produces a sudden increase in voltage across the condenser 80 as shown in the curve 84 of FIG. 6, the voltage being negative to the zero line 85 representing the potential of bus bar 16. This step is then transmitted as a short negative pulse, as shown by the curve 86 in FIG. 7, through a small "pulse" condenser 87 to a grid 88 of a tube 89, FIG. 1A, thus producing a short sharp negative transient of plate current, as shown in curve 90 of FIG. 8, which flows from a positive supply bus bar 94 through a lead 93 to the primary 91 of a transformer 92 and thence from anode 161 to cathode 162, through lead 99 and bias resistor 98' to the negative supply bus bar 97 as shown in curve 90 of FIG. 8. The supply bus bar is positively charged relative to a bus bar 97 by means to be described later.

Figures 9, 10:
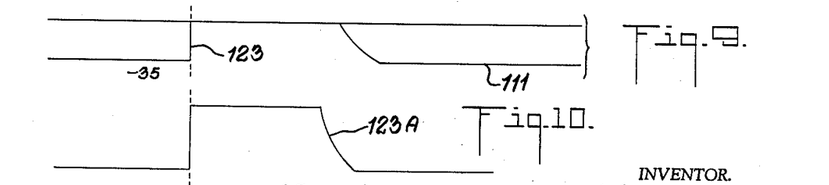
Figure 11:
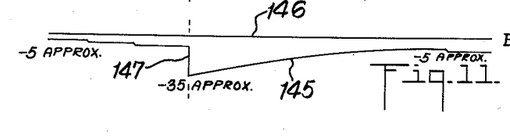

Resulting from the transient of plate current in tube 89 following each spark, an induced amplified alternating current pulse is induced in a secondary 100 of the transformer 92 which flows through a rectifier 101, resistance 102 and return lead 103 to the secondary 100. A positive potential pulse is momentarily produced between the rectifier 101 and the resistance 102 which is transmitted through a limiting resistance 104 to a pair of grids 105 in a heptode 106, or to a grid of an alternative form of a space discharge device. The amplified rectified secondary voltage is stored for a short time by a discharging condenser 107, shunted about the resistance 102 by a lead 108, bus lead 97, biassing resistor 109 and return lead 110. This positive transient voltage is high enough to drive the grids of the heptode 106 to zero voltage, as limited by grid current through the limiting resistance 104, as shown in curve 111 of FIG. 9. The voltage imposed on the grids 105 by the biassing resistor 109 through lead 110 and resistors 102 and 104 biases the heptode to prevent passage of current from the anode 121 to the cathode 112, except when a transient positive voltage is imposed on the grids 105.

The anode 121 of the heptode is connected to the positive plate of the reference condenser 26 through lead 122, bus bar 16 and lead 27, FIG. 1, and the cathode 112 is connected to the negative plate of condenser 26 through lead 113, bus bar 97 and lead 66, FIG. 1.

The positive bus bar 94 of the direct current source is connected through a lead 117, an adjustable resistance 118 and a constant resistance 119 to the screen grids 120 of the heptode 106. When a transient positive voltage is imposed on the grids 105 of the heptode by the transformer 92, triode 89 and condenser 87, as described above, the heptode 106 will permit passage of current from its anode to its cathode to discharge the condenser 26 during the transient, as shown by the curve 123A, FIG. 10, as both the heptode and condenser are connected in parallel to the bus wires 16 and 97. The rate of discharge is dependent upon the screen grid voltage of the heptode, and is adjustable by means of the adjustable resistance 118.

Figures 5, 6:
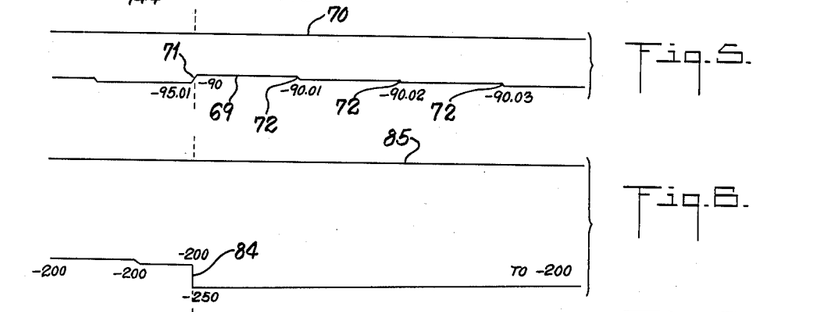

Accordingly, each time a spark occurs heptode 106 discharges the reservoir condenser 26 by a small amount and thus produces a definite downward step in voltage as shown at 71 in the curve of FIG. 5. A pentode or tetrode or other type of vacuum tube may be used in place of a heptode.

Any suitable source of direct current may be used for supplying the positive and negative bus bars 94 and 97, that shown in FIG. 1a comprising a step-up transformer 114 receiving alternating current from the mains 28 and 29 and delivering voltage to the anodes of a rectifier 115, the cathode of which is connected through a choke coil 116 to the positive bus bar 94; the transformer center tap is connected to the lead 113' and thence through a biassing resistor 109 to the negative bus bar 97. The leads 113' and 94 are connected by a condenser 116', the purpose of the choke coil and the condenser being to provide a filtered D.C. voltage between the leads.

It may be noted that the positive plates of the condensers 18 and 26 are connected to the common bus conductor 16. The negative plate of the reference condenser 26 is connected through the lead 66 and the bus conductor 97 to a resistance 124 and through this resistance to the cathode 128 of a grid controlled vacuum tube 129. The anode 130 of the vacuum tube is connected through a lead 131 to a control device such as the D.C. control winding 200, FIG. 1B, of a sensitive phase shifting network 132 to the postive D.C. bus bar 94.

The sensitive phase shifting network 132 is preferably of the type known under the registered trademark "VecTrol." The phase shifting network 132 is supplied with A.C. power through leads 28 and 29 and transformer 201 to input terminals 202, 203, and it delivers an A.C. output at terminals 163 and 164 which is phase shifted to an extent dependent upon the D.C. control current in leads 94 and 131 which flows through a control winding 200.

The A.C. output from terminals 163, 164 of the phase-shifting network is split into equal halves by resistors 165, 166, the common point of which is connected through lead 167 to the cathodes of thyratrons 168, 169. The terminals 163, 164 are connected respectively to the grids 170, 171 of thyratrons 168, 169, through resistors 172, 173, and the customary small transient filter condensers 174, 175 are connected from each grid to cathode. The anodes 176, 177 are connected in a full wave A.C. circuit for controlling the power input from the A.C. line to the high voltage transformer in the manner hereinabove described.

The anode current through the vacuum tube 129, which is the control current for the phase shifting network or control device 132, is controlled by the potential of its grid 133 relative to the potential of its cathode 128. Potential is supplied to the grid 133 from the negative plate of the condenser 18 through the lead 19, thence through a lead 134, a resistance 135 and a lead 136. A condenser 137 is connected between the lead 127 and the lead 136 and thus between the cathode and the grid. A rectifier 138 is shunted across the resistance 135 to permit current from the grid to the lead 134. It will thus be apparent that passage of anode current through the vacuum tube 129 is governed by the difference in potential of the negative plates of the condensers 18 and 26 since these plates are connected to its grid 133 and cathode 128 respectively and since the positive plates of these condensers are connected together and are at equal potential. Accordingly, as the voltage of the condenser 26 is gradually increased, the anode current through the vacuum tube increases, but when a spark occurs and the voltage of the condenser 18 is increased and the voltage of condenser 26 is reduced, the current through the vacuum tube is reduced.

The connections of the phase shifting network 132 are such that when the anode current from the tube 129 increases, the firing angles of the thyratrons 168 and 169 controlled by the system are advanced to increase the output of current to the precipitator and when the anode current is reduced the firing angles are retarded to supply reduced current to the precipitator. When the anode current is zero the thyratron firing angles are retarded so as to give substantially zero current in the thyratrons and substantially zero output from the high voltage power supply which is controlled by them.

The phase shifting network or control device 132 is not illustrated as its construction is not, per se, a part of the present invention. Control devices for controlling thyratrons or for otherwise controlling the flow of A.C. power in accordance with a current varied in such control device and supplied through leads such as 94 and 131 are known in the art and such known control devices may be used in place of the phase shifting network 132 and thyratrons 168, 169.

The arrangement described above gives only partial lowering of the precipitator current after a spark because insufficient negative voltage is applied to the grid 133 of the tube 129 to cut off its anode current so as fully to retard the phase angle of the thyratrons 168 and 169. In order to quench or suppress the output of the thyratrons 168 and 169 and of the precipitator current so as to inhibit the formation of an arc in the percipitator, a negative transient voltage is also applied to the grid 133 of the control tube 129 sufficient to reduce this current momentarily to zero. This negative voltage is supplied through a small condenser 140, FIG. 1A, which derives its transient voltage or potential from a point on the spark sensing and reference-condenser discharging circuits which develops a sudden change of potential in the negative direction each time a spark occurs.

In the arrangement shown in FIG. 1A, the negative plate of condenser 140 is connected through lead 141 to the grid 133, and the positive plate of condenser 140 is connected through lead 140' to the screen grids 120 of the heptode discharge tube; the said screen grids 120 are supplied with current from the positive bus bar 94 through lead 117, adjustable resistor 118 and fixed resistor 119. Under normal conditions, when the heptode control grids 105 are negatively biased so as to prevent the flow of anode current, there is little or no flow of current to the screen grids 120 and accordingly the potential of said screen grids and of the positive plate of condenser 140 is substantially equal to the potential of the positive bus bar 94. Upon the occurrence of a spark, the grids 105 are driven to zero voltage as shown by the transient 123 in FIG. 9 and a pulse of anode current flows as shown by the transient 123A in FIG. 10; at the same time the screen grids 120 will conduct for a short period, similar to the transient pulse 123A in FIG. 10 and this will cause the potential of the screen grids 120 and of the positive plate of condenser 140 to drop abruptly, due to the voltage drop in resistors 118 and 119. This abrupt drop of potential is transmitted through condenser 140 as a pulse of negative potential to the grid 133 of tube 129 which is sufficient to cut off the anode current flowing through the control device 132 and so to retard the firing angle of the thyratrons 168 and 169 and to interrupt or suppress the current to the precipitator for a short time sufficient to quench a spark and thereafter to permit current to the precipitator at the normal reduced rate. The duration of suppression or quenching of the precipitator current is extended by condenser 137 which stores the negative electric charge transmitted by condenser 140, and this charge is allowed to leak off only slowly through resistor 135. Rectifier 138 is provided so that positive charges can rapidly leak off the grid 133 but negative charges can only leak off slowing through resistor 135.

The rectifier 182, FIG. 1B, which supplies power to the precipitator 180 is shown diagrammatically as comprising four sections which may comprise solid state rectifier elements such as selenium, or may comprise vacuum tubes such as those sold under the trade name "kenotron." These rectifiers, especially if of the vacuum tube type, will withstand current only to a limiting safe value. To prevent the average precipitator current from exceeding this limit a current limiting circuit is provided, generally in accordance with U.S. Patent No. 2,554,695. In this circuit a cathode 148 of a diode rectifier 149, FIG. 1A, is connected by a lead 150 to the adjustable potentiometer 96 to supply to the cathode a controlled direct current reference voltage. The anode 151 of the rectifier is connected by a lead 152 to the positive bus wire 16 which in turn is connected to the positive terminal 12 of the potentiometer 14, FIG. 1B, which is in series with the load of the precipitator circuit. Under normal load conditions the D.C. voltage which is tapped off from the potentiometer 14, and which appears across condenser 18 is less than the reference voltage applied to the cathode 148 of the diode from the lower section of potentiometer 96 between tap 150 and bus bar 97. The potential at the cathode 128 of the tube 129 is slightly more positive (or its negative potential lower) than the potential of its grid 133 (and of the negative plate of condenser 18) as a result of the normal balance between the feedback voltage from the condenser 18 and the reference voltage from the condenser 26; accordingly the potential at the cathode of the diode 149 is higher in a positive direction, than the potential at its anode 151 so that the diode does not conduct. However, when the precipitator current reaches its safe limiting value, the voltage tapped off potentiometer 14 and fed back across condenser 18 becomes greater than the current-limiting reference voltage from the lower part of potentiometer 96 which is applied to the cathode 148. Since the cathode potential of the triode 129 closely follows the grid potential, which becomes more negative as the precipitator current increases, the potential applied to the cathode 148 of diode 149 becomes more negative, to the point at which the diode 149 starts to conduct. Thereafter the conduction of the diode 149 exerts an over-riding control over the potential of the cathode 128 of the triode tube 129 by preventing the cathode from becoming more negative. This over-riding control is a result of the conduction of the diode 149 which is in circuit about the reference condenser 26 through the leads 66, 65, 96, 150, 152, 16 and 27, and prevents charging of the condenser 26 above the safe limit. Any further increase in precipitator current is then inhibited since any such increase would increase the negative potential at the grid 133 of the tube 129 relative to its cathode 128 and would thereby reduce the plate current of this tube to the control device 132 and sharply retard the thyratron firing angle.

Details of accessory elements not forming a part of the invention may be added, such as a microammeter 153 in the lead 65, an electrostatic voltmeter 154 between the bus wire 16 and the lead 65, and the heating system comprising a transformer 155 supplied from the branch mains 30 and 31 and circuit 156 to heat the cathodes 148, 112, and the cathodes of the tube 129, 89.

*Résumé*

The system of my invention comprises an electrical system for controlling current supplied through the leads 94 and 131 to the control device 132 of the thyratrons 168 and 169, the firing angle of which controls the supply of current to an electric dust precipitator, or other high voltage load, which is subject to intermittent sparking. An increase in the current supplied through the leads 94 and 131 acting through the control device 132 serves to vary the phase relation in the grid circuits of the thyratrons to advance their firing angle and permit an increase in the current supplied to the precipitator, while a decrease in the current supplied to the control device 132 has the reverse effect.

The current supplied through the leads 94 and 131 is controlled by the triode 129 (FIG. 1A), the cathode 128 of which is charged from the negative plate of the reference condenser 26, FIG. 1, and the grid 133 of which is charged from the negative plate of the feedback condenser 18, FIG. 1B, the positive plates of these condensers being connected by the bus wire 16. The anode current passing through the triode 129 and through the control device 132 is controlled by the relative potentials applied to the cathode 128 by the condenser 26 and to the grid 133 by the feedback condenser 18, the current decreasing as the negative potential of the grid increases relative to the potential of the cathode 128 and increasing as the negative potential of the cathode increases relative to the potential of the grid; for the purpose of this description the bus bar 16 is assumed to be at zero potential. The voltage of the reference condenser 26 is maintained within a variable range which is normally independent of the current in the precipitator. The voltage of the feedback condenser 18 is proportional to the average current supplied to the precipitator inasmuch as it is in parallel with a part of the potentiometer 14 through which the precipitator current passes and accordingly in which the voltage is proportional to the precipitator current. Should the precipitator current increase, the negative potential of the grid 133 would increase proportionately, and if the negative potential supplied to the cathode by the reference condenser 26 did not increase proportionately the current to the control device 132 and the output of the thyratrons 168 and 169 would decrease until the precipitator current was brought to a value determined by the voltage across the reference condenser 26. The triode 129 thus acts as an electric balance between the voltages of the reference condenser 26 and the feedback condenser 18 to control the precipitator current.

The voltage of the reference condenser 26 rises from a lower value to a larger value gradually, or in minute steps, until such time as sparking may occur in the precipitator; the voltage charging of the condenser 26 is accomplished by charging the condensers 37, of very small capacity relatively to the condenser 26, from the transformer 33 to a high voltage during one-half cycle of the transformer voltage, and transferring the charge from condenser 37 to the condenser 26 through the transformer 48 during the next half cycle, this process being repeated during alternate half cycles of the supply frequency. The alternate charging and discharging of the condensers 37 is controlled by the rectifier 41 and the small thyratron 45 which is controlled by the circuits 54–59. The induced voltage in the secondary 62 of the transformer 48 is rectified by the cathode 40 and the anode 68 of the rectifier 41 and applied to the condenser 26. The above system charges the condenser 26 a small amount at each cycle of the power circuit, for example, sixty cycles per second, and thus causes the voltage of condenser 26 to rise gradually and continuously as long as there is no sparking in the precipitator. This causes the precipitator current to increase gradually and continuously until such time as a spark occurs. As soon as a spark occurs the voltage of the reference condenser 26 is stepped down, so that the precipitator current is reduced to a value slightly less than that at which sparking occurs. After each spark, the reference condenser voltage and precipitator current again gradually increase until the next spark again steps down the reference voltage, and this process continues, indefinitely, with sparks occurring at random or regular intervals dependent upon the precipitator load conditions.

The step down in voltage of the condenser 26 is accomplished by the following circuit:

The voltage drop in the potentiometer 14 is transmitted through the peak rectifier 75 to the condenser 80. The condenser 80 is shunted by the leak resistor 82, having a suitable time constant to allow its charge to leak away substantially between successive sparks. The voltage of the condenser 80 remains substantially constant so long as there is no sparking. When a spark occurs the potential drop across the potentiometer 14 increases sharply producing a sudden step increase in the voltage across the condenser 80 which is transmitted as a short negative pulse through the condenser 87 to the grid 88 of the tube 89 thus producing a short sharp negative transient of plate current through the transformer primary 91. This produces a short amplified transient secondary current in the secondary 100 which is rectified by the rectifier 101 and stored for a short time by the condenser 107, the time being controlled by a shunt resistor 102. This positive transient passing through the high limiting resistance 104 is high enough to drive the grids 105 of the heptode 106 into the positive grid current region and therefore the heptode will discharge the condenser 26 which is in parallel with the heptode anode-cathode path through the lead 122, bus wire 16, leads 27, 66, 97 and 113. The condenser 26 is discharged at a current rate determined by the screen grid voltage of the heptode 106, and which may also be dependent upon the intensity of the spark and of the pulse which it creates. Accordingly, each time a spark occurs the heptode tube 106 discharges the reference condenser 26 by a small amount and produces a sudden downward step in its reference voltage. The average lapse of time between successive sparks is dependent upon the relative amplitudes of the small charging steps from condensers 37 at each 1/60 second and the above larger downward step in the condenser 26 produced by each spark.

This downward step in the voltage of condenser 26 produces only a partial "quenching" of the precipitator current after a spark because insufficient negative voltage is applied to the grid of the tube 129 to cut off its current to fully retard the thyratron phase angle. In order to quench or suppress the output of the tube 129 and thus through the thyratrons 168 and 169 to interrupt the precipitator current to prevent the formation of an arc, a negative voltage transient is applied to the grid of the tube 129 through the small condenser 140 which derives its transient from the sudden step-down in voltage at the screen grids 120 of the heptode 106 which results from the grids 105 being driven into the positive region each time a spark occurs. The transient of condenser 140 is transmitted as a negative pulse to the grid 133 of tube 129. The combination of this negative transient with the negative feedback voltage from the condenser 18 interrupts the current to the control device 132 and accordingly interrupts or greatly decreases the current in thyratrons 168 and 169. The transient voltage is stored in condenser 137 but decays after a few half cycles due to leakage through the resistor 135. Thereupon the passage of current through the tube 129 is restored under the potential balance between the condensers 18 and 26 applied to the grid and cathode of tube 129, to a value slightly less than that prevailing before the spark.

Figure 14:
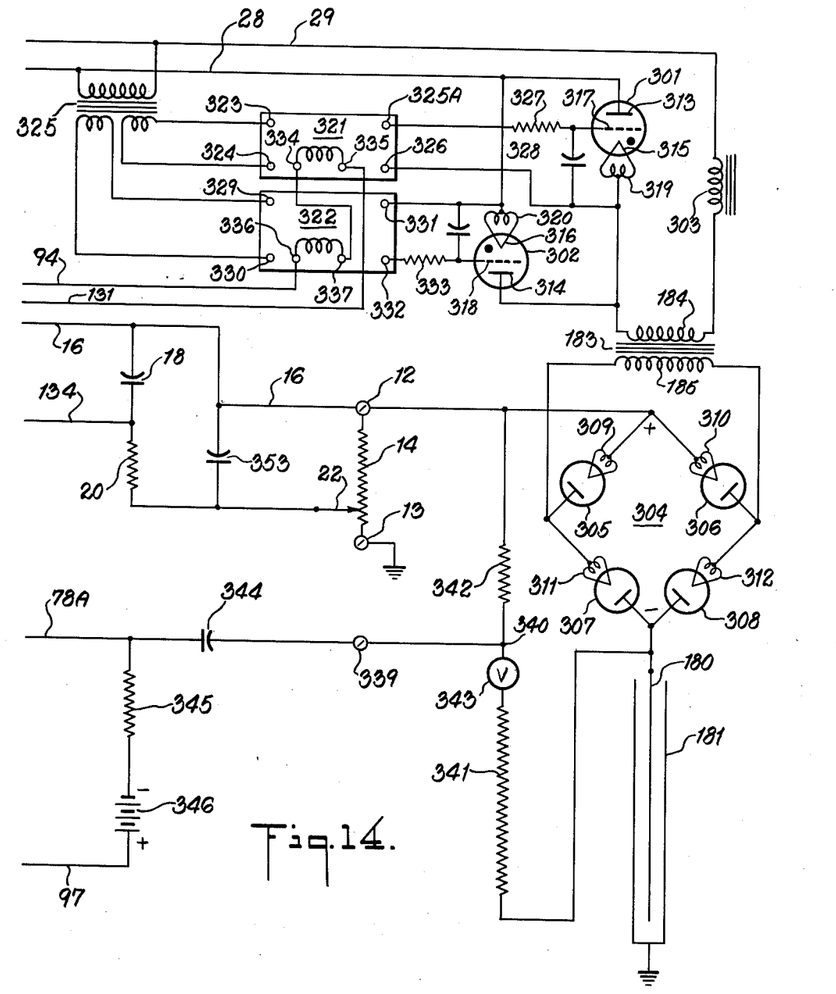
FIG. 14 shows a wiring diagram which is alternative to that of FIG. 1B.

The circuit conducting current to the precipitators comprises elements, such as kenotron or other rectifiers, which will safely withstand current only up to a certain limit. A current-limiting circuit is therefore provided to prevent the average precipitator current from exceeding this safe limit. In this circuit the diode rectifier 149, FIG. 1A, has its cathode 148 connected to the potentiometer 96 to provide a source of direct current of adjustable potential derived through the lead 95 from the transformer 114 and rectifier system 115. The anode 151 of the diode is connected to the positive bus wire 16 leading to terminal 12 of the potentiometer 14 which is in series with the precipitator load. Under normal load conditions the direct current voltage tapped from the potentiometer 14 and fed back across condenser 18 to grid 133 is less than the reference voltage applied to the reference diode 149 from the lower part of the potentiometer 96, and since the potential of cathode 128 is slightly more positive than that of grid 133, the potential of the diode cathode 148 will be positive with respect to its anode 151 and no current will flow through the diode. When the current to the precipitator increases to the safe limit the potentials of the grid 133 and cathode 128 of the tube 129 become more negative, thus making the potential of the diode cathode 148 less positive than its anode 151 and allowing current to flow through the diode. As the cathode of the control tube 129 is connected to the cathode of the diode 149 through the D.C. reference voltage supplied from the lower part of potentiometer 96, leakage of current through the diode prevents the potential of the control tube cathode 128 from becoming more negative, and thus limiting the current to the control device and limiting the thyratron output and thus preventing any further increase in current to the precipitator.

In FIGS. 2–9 and 11 voltages and potentials have been indicated to illustrate their magnitude for a particular installation. The bus bar 16 is considered to be at zero potential in these figures and the description relating thereto. The method and apparatus is not, however, limited to these values.

The wiring diagrams of FIGS. 1, 1A and 1B show the details of one particular arrangement of my invention. Various modifications can be made without departing from my invention.

Figures 12, 13:
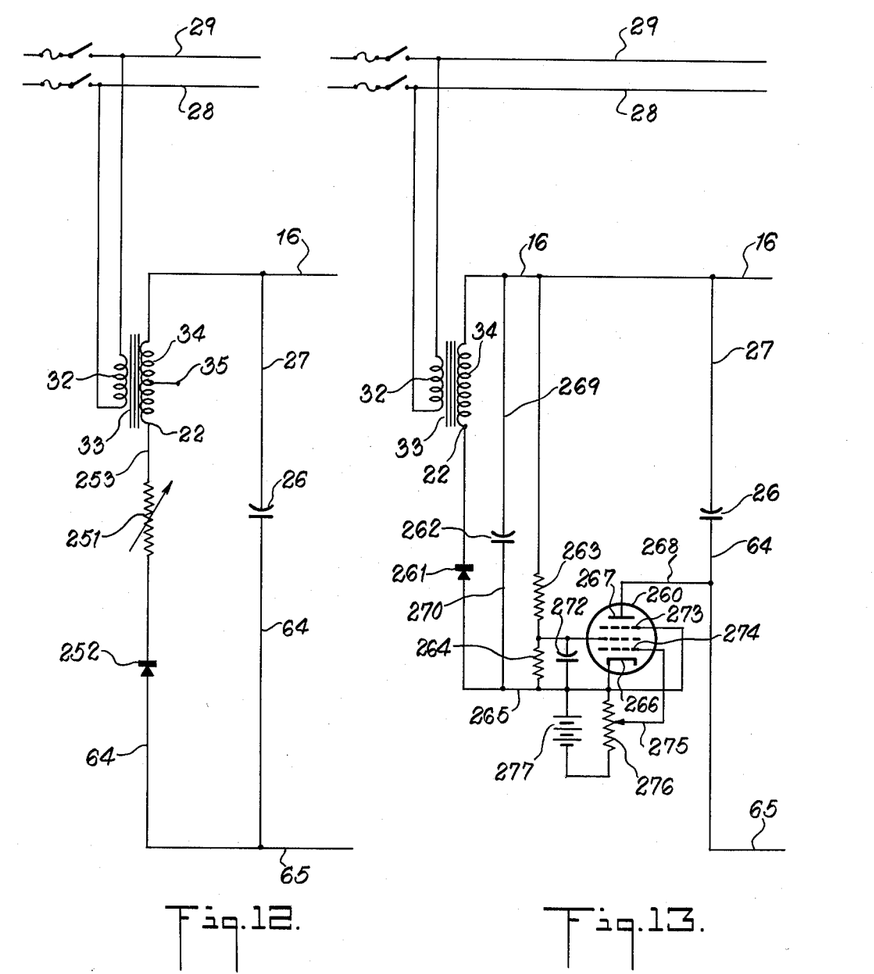
FIGS. 12 and 13 show wiring diagrams which are alternative to those of FIG. 1.

FIG. 12 shows a modified wiring diagram which can be used in conjunction with FIGS. 1A and 1B, as an alternative to the diagram of FIG. 1; for clarity several of the components and connections in FIG. 12 are numbered similarly in FIG. 1. In FIG. 12 the reference condenser 26 is charged from transformer secondary 34 through a high resistance 251 and rectifier 252. The value of the resistance 251 is sufficiently high to ensure a relatively slow rate of charging of the condenser 26. The rate of charging can be adjusted either by varying the value of resistance 251 or by varying the voltage of transformer secondary 34, for instance by changing the connection 253 from its end terminal 22 to an intermediate tap 35.

FIG. 13 shows another modified wiring diagram which can be used as an alternative to that of FIG. 1A. In FIG. 13 the reference condenser 26 is charged at a relatively slow and constant rate through a pentode tube which has a substantially constant characteristic of anode current in relation to its cathode-to-anode voltage. For this purpose the voltage developed by transformer secondary 34 is rectified by rectifier 261 and the rectified voltage is filtered by condenser 262 and applied to the load resistances 263 and 264 which are serially connected across the condenser 262. The negative terminal of rectifier 261 is connected by lead 265 to the cathode 266 of the pentode 260, and the anode 267 of the pentode is connected through leads 268 and 64 to the negative terminal of the reference condenser 26. Charging current can accordingly flow from the positive plate of filter condenser 262, through lead 269, bus wire 16, and lead 27 to the positive plate of condenser 26, and thence from the negative plate of condenser 26 through leads 64 and 268 to the anode 267 of the pentode, through which it flows as space current to the cathode 266, and so through leads 265 and 270 to the negative plate of condenser 26. Said charging current will flow as long as the voltage across condenser 262 is maintained at a substantially higher value than the voltage across condenser 26, and this is ensured by suitable design of the transformer secondary 34 and rectifier 261, while the difference in voltage appears across the anode 267 and cathode 266 of the pentode 260. It is well known to those skilled in the art that the anode current of a pentode is substantially constant, providing its various grid voltages are kept constant. For this purpose the screen grid 271 is supplied from the positive end of the load resistor 264, the negative end of which is connected to the cathode 266, and a filter condenser 272 is connected across resistor 264; the suppressor grid 273 is connected to cathode 266. The control grid 274 is connected to an adjustable tapping 275 on a potentiometer 276 which is supplied with a constant biassing voltage from a D.C. source known as a battery 277, and the positive end of the potentiometer is connected to cathode 266. The anode current of the pentode 260, and consequently the charging rate of the reference condenser 26, may then be set at any predetermined, substantially constant, value by setting the potentiometer tap 275 at the required point; the charging rate may be adjusted within wide limits by varying the setting of the potentiometer tap 275. In order to provide a sufficiently slow charging rate it is desirable to limit the anode current to the order of 1 milliampere or less and for this reason the screen voltage applied by the load resistor 264 should be low in comparison with that used in normal pentode operation.

Figure 15:
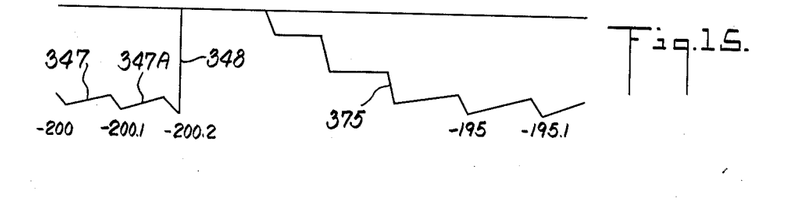
FIGS. 15, 16 and 17 are charts of the voltages and currents at various points in the circuits.
Figure 16:
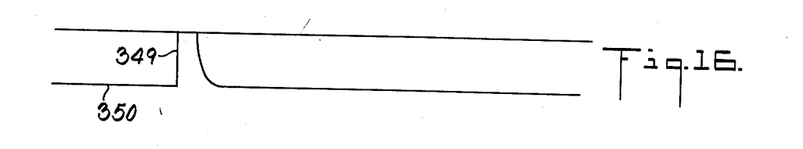
Figure 17:
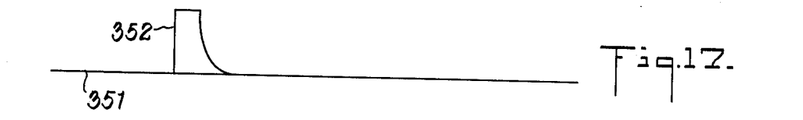

FIG. 14 shows a modified wiring diagram which can be used in conjunction with FIGS. 1 and 1A, as an alternative to the diagram of FIG. 1B; several of the components and connections are similar to those of FIG. 1B and are similarly numbered. FIGS. 15–17 show the approximate wave forms at various points in the circuit of FIG. 14. In FIG. 14 the primary 184 of the high voltage transformer 183 is connected across the A.C. mains 28 and 29 in series with the two "back-to-back" connected thyratrons 301, 302, and in series with a reactance 303 which may however be constituted by the internal or leakage reactance of transformer 183. The high voltage rectifier 304 is depicted as a bridge network of four vacuum tubes or kenotrons 305, 306, 307 and 308 having their cathodes heated by transformer windings 309, 310, 311 and 312. The thyratrons 301 and 302 are respectively provided with anodes 313 and 314, cathodes 315 and 316, and control grids 317 and 318, and the cathodes are heated by transformer windings 319 and 320. The thyratrons are connected back-to-back by connecting anode 313 and cathode 316 together to the A.C. line 28, and by connecting anode 314 and cathode 315 together to the transformer primary 184, so that the two thyratrons 301 and 302 will respectively carry the positive and negative half cycles of alternating current flowing from A.C. line 28 through the transformer primary 184 and reactance 303 to the A.C. line 29. The flow of alternating current can be controlled from its maximum uninterrupted value down to substantially zero value by delaying the firing or conduction of each thyratron simultaneously by applying alternating voltages between their cathodes and grids, which voltages are retarded in phase in relation to their cathode-to-anode voltages. This result is obtained by means of "VecTroL" sensitive phase shifting networks 321 and 322. The network 321 is supplied at terminals 323 and 324 with an alternating voltage from transformer 325 and it delivers an alternating voltage of variable phase angle at terminals 325A and 326, which is applied between the grid 317 and cathode 315 of thyratron 301, through the usual series resistor 327 and having a transient filter condenser 328 connected between grid and cathode. Similarly, the network 322 is supplied with an alternating voltage at terminals 329 and 330 and delivers an alternating voltage of variable phase angle at terminals 331 and 332; these terminals are connected respectively to the cathode 316 and grid 318 of thyratron 302, through resistor 333 in such a sense that the cathode-to-grid voltages of the thyratrons 301 and 302 are substantially in phase opposition. The phase shifting networks are provided with D.C. control windings which are internally connected between terminals 334—335 and 336—337, respectively; the control windings of the two networks are connected in series with each other by conductor 338, across the conductors 94 and 131. Accordingly the control windings of both networks are in series with each other and with the anode-cathode path of tube 129 of FIG. 1A, and the current flowing through the two thyratrons 301 and 302 may be simultaneously varied from zero to maximum by varying the anode current of tube 129 from zero to a predetermined value. The alternative form of power control system hereinabove described with reference to FIG. 14 may be used instead of that shown in the upper and right hand sections of FIG. 1B.

FIG. 14 also illustrates an alternative method of sensing the occurrence of a spark in the precipitator and of using the signal so obtained for slightly discharging the reference condenser 26 of FIG. 1 and for quenching the spark by momentarily suppressing the anode current in tube 129. With this objective, an additional control signal terminal 339 is provided, and this is connected to a tapping point 340 on a high resistance potential divider comprising resistors 341 and 342 which are serially connected between the high voltage precipitator wire 180 and the opposite terminal of the high voltage rectifier which is connected to terminal 12; a sensitive milliammeter 343 may be connected in series with said resistors 341 and 342 and calibrated in kilovolts. FIG. 15 shows the typical wave form of the voltage across resistor 342 and therefore of the potential at terminal 339 in relation to terminal 12 of the control circuit; this potential slowly builds up as an increasing negative value as at 347, 347A, corresponding to an increasing precipitator voltage until a spark occurs in the precipitator which temporarily short circuits the output of rectifier 304 and reduces the voltage across resistors 341 and 342 substantially to zero, resulting in a sudden and large downward step in negative voltage at 348, amounting to a sudden change of potential in a positive direction at terminal 339. This is transmitted as a short pulse of positive potential through a small condenser 344 to the lead 78A and thence to the grid 88 of tube 89 in FIG. 1A as shown at 349 in FIG. 16. In this arrangement, the grid 88 is normally biased negatively, as shown at 350 in FIG. 16, so as to cut off the anode current of tube 89 substantially to zero; this bias is provided through resistor 345 from a D.C. source shown diagrammatically as a battery 346; alternatively the resistor 345 and D.C. source 346 may be omitted and the resistor 98 of FIG. 1A may be connected at its lower end to a point on resistor 109 instead of to bus bar 97. Fig. 16 shows the waveform of the cathode-to-grid voltage of tube 89, and FIG. 17 shows the corresponding anode current of this tube, which also passes through the primary 91 of transformer 92. It will be noted that this anode current is normally zero, as shown at 351, and that is rises abruptly for a short period at 352, upon the occurrence of a spark. This effect is opposite to the abrupt fall of anode current which is depicted at 90 in FIG. 8 and which is produced by the current sensing signal from the circuit of FIG. 1B; accordingly the relative polarity or phasing of the primary 91 and secondary 100 of the transformer 92 in FIG. 1A when using the voltage-sensing signal from FIG. 14 should be opposite to that when using the current-sensing signal from FIG. 1B. Then the transformer secondary 100 will in either case apply a pulse of positive potential to the grids 105 of tube 106 as shown at 123 in FIG. 9.

From this point onwards, the operation of the system comprising FIGS. 1, 1A and 14 is similar to that of the system comprising FIGS. 1, 1A and 1B. The heptode 106 draws a pulse of anode current, shown at 123A in FIG. 10, and slightly discharges the reference condenser 26, FIG. 1, as shown at 71 in FIG. 5. At the same time, a negative pulse of potential is transmitted from the screen grids 120 of the heptode 106, through condenser 140, to the grid 133 of tube 129 as shown at 147 in FIG. 11, and this temporarily cuts off the anode current in tube 129, thus temporarily suppressing the current through thyratrons 301, 302 and quenching the spark.

During the periods when sparks are not occurring, the circuit of FIG. 14 operates in conjunction with the circuits of FIGS. 1 and 1A to regulate the average value of the precipitator current, in the same way as the circuit of FIG. 1B. In FIG. 14, however, an additional condenser 353 is connected across the upper portion of the potentiometer 14 for the purpose of filtering the current signal and reducing the possibility that a sharply peaked current signal might incorrectly initiate anode current pulses in the tubes 89 and 106 and create unwanted discharge of the reference condenser 26 in the absence of a spark. The inclusion of reactance 303, either as a separate reactor or as increased reactance of transformer 183 has a similar desirable effect, added to which it has been found possible to maintain a higher average precipitator voltage by using such increased reactance to lengthen the duration of the precipitator current pulses until conduction become almost continuous; while such a close approach to continuous conduction might be conducive to the formation of an arc, it has been found by extended practical test that the spark quenching feature of my improved control system invariably prevents the formation of an arc.

Figure 18:
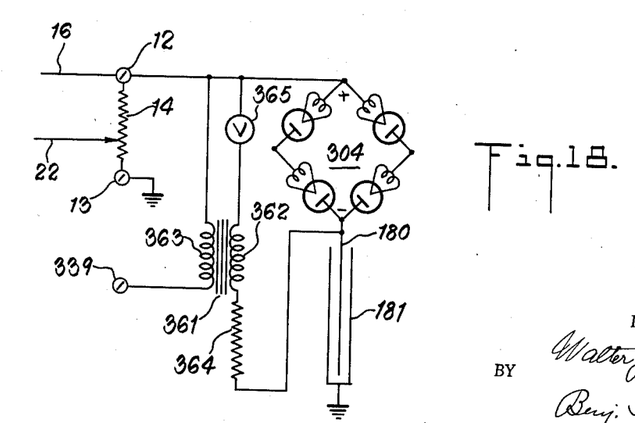
FIG. 18 shows another alternative wiring diagram of a portion of the apparatus.

FIG. 18 shows an alternative circuit arrangement which may replace a part of the wiring diagram of FIG. 14, and some of its components and connections are similarly numbered. In FIG. 18, however, the occurrence of a spark is sensed by means of a transformer 361 having a primary 362 and a secondary 363. The primary 361 is connected in series with a high resistance 364, and if desired, a sensitive milliammeter 365, across the positive and negative terminals of the rectifier 304, namely between the precipitator wire 180 and the control signal terminal 12. The secondary 363 is connected between terminal 12 and the voltage sensing control signal terminal 339; the remainder of the circuit may be similar to FIG. 14.

Figure 19:
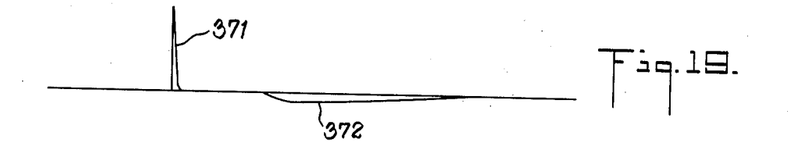
FIG. 19 is a chart of a voltage waveform in the arrangement of FIG. 18.

FIG. 19 shows the waveform of the potential applied to terminal 339 with respect to terminal 12 by reason of the voltage developed in the transformer secondary 363. This voltage takes the form of a sharp spike 371 which is induced by the sudden cessation of current in the primary 362 upon the occurrence of a spark, and this spike is transmitted as a potential pulse through the condenser 344 of FIG. 14; when the precipitator voltage slowly recovers after a spark, as at 375 in FIG. 15, a wide pulse of small amplitude and of negative polarity is produced, as at 372 in FIG. 19, but this will not produce any perceptible response in the control equipment, due to the small rate of change of its potential.

While I have described several embodiments of my invention, it will be appreciated by those skilled in the art that many other detailed circuit modifications are available which can be used without departing from the spirit of my invention.

What I claim is:

1. A control system for an electric power converter for supplying power to a load circuit which is subject to intermittent sparking comprising: a source of reference voltage increasing in timed increments within limits independently of the power output of said converter; a control system for varying the output of the converter in accordance with said reference voltage whereby the converter output is progressively increased; means for sensing a spark in the load circuit; and means for reducing the reference voltage upon the sensing of a spark.

2. A control system for an electric power converter for supplying power to a load circuit which is subject to intermittent sparking comprising: a source of reference voltage increasing in timed increments within limits independently of the power supplied to said load circuit; a feed back voltage increasing in proportion to the increase in power supplied to the load circuit; means balancing the said feed back voltage against said reference voltage to vary the power supplied to said load circuit in accordance with said reference voltage; means to sense a spark in said load circuit and means actuated by said spark sensing means to reduce said reference voltage to the lower limit upon the sensing of a spark.

3. A control system for an electrical power converter for supplying power to a load circuit which is subject to intermittent sparking, comprising: a control device for varying the output of the converter in accordance with a reference voltage; a source of increasing reference voltage whereby the converter output is progressively increased to a voltage at which sparking occurs in said load circuit; means for sensing a spark in the load circuit; and means for reducing the reference voltage upon the sensing of a spark, in which said source of reference voltage includes a reference condenser for maintaining a D.C. reference voltage and a charging circuit for said condenser which comprises: a half-wave rectifier connected in series with a charging condenser across an A.C. source; a grid-controlled space discharge device connected in series with the primary of a transformer across said charging condenser; a second rectifier connected in series with the secondary of said transformer across the reference condenser; and a source of alternating potential applied to the grid of said space discharge device, whereby said charging condenser is charged through said half-wave rectifier and discharged through said space discharge device during alternate half cycles.

4. The combination of claim 3 in which the capacitance of the charging condenser is adjustable to vary the rate of charging of the reference condenser.

5. The combination of claim 3 in which the voltage of the A.C. source is adjustable to vary the rate of charging of the condenser.

6. A control system for a high voltage electric power supply comprising a reference condenser; a charging circuit for developing across said condenser a progressively increasing D.C. reference voltage; a feedback impedance coupled to the output of said power supply; a control device for continuously regulating the output of said power supply; a feedback circuit including said reference condenser, said feedback impedance and said control device, whereby said output is regulated in accordance with said increasing reference voltage; means for sensing a spark in the output circuit; and a discharging circuit coupled to said spark sensing means whereby said reference condenser is partially discharged upon the occurrence of a spark.

7. The combination of claim 6 in which control means are provided for at least partially suppressing the output of said power supply for a limited period following the occurrence of a spark.

8. The combination of claim 6 in which the feedback impedance is connected in series with a ground return lead from the power supply.

9. The combination of claim 6 in which the feedback impedance comprises a resistor.

10. The combination of claim 9 in which the voltage developed across said resistor is filtered by means of a condenser.

11. The combination of claim 6 in which the control device comprises: a grid-controlled vacuum tube; a phase-shifting network having a control winding in series with the anode of said vacuum tube, and having an A.C. input and a phase-shifted A.C. output; and a space discharge device having control electrodes connected to said phase-shifted A.C. output, and main electrodes controlling a source of A.C. power for the high voltage electric power supply.

12. The combination of claim 6 in which the control device comprises a vacuum tube, and in which the reference condenser and the feedback impedance are serially connected to the grid and cathode respectively of said vacuum tube.

13. The combination of claim 12 including a pulse condenser connected from the grid of the feedback vacuum tube to a point on the spark sensing and discharge circuits such that upon the occurrence of a spark a negative pulse of potential is applied to the grid of said vacuum tube of such intensity as temporarily to suppress a substantial part of the part of the output of the power supply.

14. The combination of claim 13 in which the discharging circuit comprises a discharge vacuum tube having a screen grid which is connected to a positive D.C. source through a high resistance, and which has an anode-cathode path connected across the reference condenser, and having at least one control grid which is energized to cause the anode-cathode path to condut and to partially discharge the reference condenser upon the sensing of a spark in the output circuit; in which the pulse condenser is connected between the screen grid of the discharge vacuum tube and a control grid of the feedback vacuum tube so that upon sudden conduction of the discharge tube its screen voltage is suddenly lowered.

15. The combination of claim 6 in which the spark sensing means comprises a rectifier connected in series with an energy storage circuit across at least a part of the feedback impedance, said energy storage circuit including a condenser connected effectively in parallel with a resistor.

16. The combination of claim 6 in which the discharging circuit comprises a discharge vacuum tube having an anode-cathode path which is connected across the reference condenser, and having at least one control grid which is energized to cause the anode-cathode path to conduct and to partially discharge the reference condenser upon the sensing of a spark in the output circuit.

17. The combination of claim 16 in which the vacuum tube is a heptode, of which two grids are connected together to control the anode-cathode current path.

18. The combination of claim 16 in which the control grid is connected through a high resistance to a source of negative bias and is also connected through a rectifier and the secondary winding of a transformer to said source; the primary of said transformer being connected in the anode-cathode circuit of a second vacuum tube supplied from a D.C. source; the grid of said second vacuum tube being connected through a condenser to the spark sensing circuit whereby upon the occurrence of a spark, the anode current of said second vacuum tube is suddenly changed and a pulse of positive potential is applied to the grid of the discharging vacuum tube to cause its anode-cathode path to conduct.

19. The combination of claim 6 in which the charging circuit comprises a D.C. source and an impedance serially connected across the reference condenser.

20. The combination of claim 19 in which the impedance comprises a resistive element.

21. The combination of claim 19 in which the impedance comprises a space discharge device in which the current is substantially independent of the voltage.

22. The combination of claim 19 in which the impedance is adjustable to vary the rate of increase of D.C. reference voltage.

23. The system of claim 6 having a charging condenser to be charged periodically from an alternating power circuit during one phase of a cycle of said power circuit and discharged during an alternating phase of said cycle and a circuit actuated by said discharge to charge said control device for varying the output of the converter in successive steps, one for each cycle.

24. The system of claim 6 in which said means to partially discharge the reference condenser comprises a heptode tube in short circuit relation to said reference condenser and normally biased to prevent short circuiting, a discharge condenser across a grid circuit of the heptode, and a peak rectifier to charge said discharging condenser upon spark current in said apparatus, and means actuated by the voltage in said discharge condenser to neutralize the bias in said heptode tube for a limited time period to partially discharge said reference condenser.

25. The system of claim 24 in which said means to neutralize the bias of the heptode tube comprises a circuit including an amplifier tube and a transformer primary in series and in which the grid of the amplifier tube is charged with a short pulse from said spark sensing means, and a secondary of said transformer connected in series with a rectifier and a resistor connected between the cathode and a pair of grids of said heptode.

26. The control system for an electrical power converter for supplying power to a load circuit which is subject to intermittent sparking, comprising: a control device for varying the output of the converter in accordance with a reference voltage; a source of increasing reference voltage whereby the converter output is progressively increased to a voltage at which sparking occurs in said load circuit; means for sensing a spark in the load circuit; and means for reducing the reference voltage upon the sensing of a spark, said control device comprising: a grid-controlled vacuum tube; a phase-shifting network having a control winding in series with the anode of said vacuum tube, and having an A.C. input and a phase-shifted A.C. output; and a space discharge device having control electrodes connected to said phase shifted A.C. output, and main electrodes controlling a source of A.C. power for the high voltage electric power supply.

27. An electric control system to control the current in the circuit of electric apparatus which comprises a potentiometer in series with the current to said electric apparatus to provide a potential difference proportional to said current, a feedback condenser charged from said potentiometer, a reference condenser charged independently between varying limits and having its anode connected to the anode of said feedback condenser, a control circuit comprising a grid-controlled vacuum tube having its cathode connected to the cathode of said reference condenser and its grid connected to the cathode of said feedback condenser to control the current in accordance with the difference between the potentials of said feedback condenser and said reference condenser, a charging means for said reference condenser comprising a source of alternating voltage, a transformer having its primary connected to said source of alternating voltage and having in series with its secondary a charging condenser and a rectifier to charge said charging condenser during one phase of said alternating current, a second circuit including said charging condenser and comprising in series a primary of a second transformer and a thyratron to conduct at the alternate phase of said alternating current, the secondary of said second transformer being connected to said reference condenser through a circuit comprising a rectifier.

28. An electric control system to control the current in the circuit of electric apparatus which comprises a potentiometer in series with the current to said electric apparatus to provide a potential difference proportional to said current, a feedback condenser charged from said potentiometer, a reference condenser charged independently between varying limits and having its anode connected to the anode of said feedback condenser, a control circuit comprising a grid-controlled vacuum tube having its cathode connected to the cathode of said reference condenser and its grid connected to the cathode of said feedback condenser to control the current in accordance with the difference between the potentials of said feedback condenser and said reference condenser, a circuit to limit the current in said control circuit comprising a rectifier in series with the reference condenser and the anode of the rectifier being connected to the positive pole of the potentiometer and a source of negative potential connected to the cathode of said rectifier and of potential insufficient to pass current through said rectifier at normal voltage in said potentiometer but sufficient to permit current to pass to short circuit said reference condenser when the potential of said potentiometer rises above normal.

References Cited in the file of this patent

UNITED STATES PATENTS

| | | |
|---|---|---|
| 2,675,092 | Hall | Apr. 13, 1954 |
| 2,742,104 | Hall | Apr. 17, 1956 |
| 2,823,757 | Klemperer | Feb. 18, 1958 |
| 2,833,977 | Levy et al. | May 6, 1958 |
| 2,925,142 | Wasserman | Feb. 16, 1960 |

FOREIGN PATENTS

| | | |
|---|---|---|
| 371,859 | Great Britain | Apr. 22, 1932 |